United States Patent
Priddle et al.

(10) Patent No.: US 8,190,761 B2
(45) Date of Patent: May 29, 2012

(54) SEEKING AND SYNCHRONIZATION USING GLOBAL SCENE TIME

(75) Inventors: Clinton Priddle, Upplands Väsby (SE); Per Fröjdh, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 256 days.

(21) Appl. No.: 12/521,212

(22) PCT Filed: Dec. 28, 2007

(86) PCT No.: PCT/SE2007/001176
§ 371 (c)(1), (2), (4) Date: Aug. 7, 2009

(87) PCT Pub. No.: WO2008/108694
PCT Pub. Date: Sep. 12, 2008

(65) Prior Publication Data
US 2010/0042741 A1    Feb. 18, 2010

Related U.S. Application Data (60) Provisional application No. 60/905,627, filed on Mar. 8, 2007.

(51) Int. Cl.
*G06F 15/16* (2006.01)
(52) U.S. Cl. ........................ 709/231
(58) Field of Classification Search .......... 709/231
See application file for complete search history.

(56) References Cited

U.S. PATENT DOCUMENTS

| | | | |
|---|---|---|---|
| 5,751,280 A | 5/1998 | Abbott et al. | |
| 5,784,527 A | 7/1998 | Ort | |
| 5,864,682 A | 1/1999 | Porter et al. | |
| 6,075,576 A | 6/2000 | Tan et al. | |
| 6,535,920 B1 | 3/2003 | Parry et al. | |
| 6,671,732 B1 | 12/2003 | Weiner | |
| 7,266,290 B2 | 9/2007 | Shiah et al. | |
| 7,290,057 B2 * | 10/2007 | Saunders et al. | 709/231 |
| 7,644,172 B2 * | 1/2010 | Stewart et al. | 709/231 |

(Continued)

FOREIGN PATENT DOCUMENTS

EP    1014729 A2    6/2000

(Continued)

OTHER PUBLICATIONS

International Search Report for PCT/SE2007/001176 mailed Aug. 11, 2008.

(Continued)

*Primary Examiner* — Minh-Chau Nguyen
(74) *Attorney, Agent, or Firm* — Potomac Patent Group PLLC (57) ABSTRACT

A method of seeking in a rich media stream provided from a multimedia server to at least one multimedia client, wherein the method may be executed in an encoder of a multimedia server or a decoder or a multimedia client. A seeking instruction is inserted into the media stream at time instance X, comprising an offset time instance Y, in order to be used for seeking at a global time rate. A method for enabling synchronization in a rich media stream wherein the synchronization is based on a global timeline is also provided.

24 Claims, 4 Drawing Sheets

U.S. PATENT DOCUMENTS

| | | | |
|---|---|---|---|
| 2003/0236907 A1 | 12/2003 | Stewart et al. | |
| 2004/0015595 A1 | 1/2004 | Lin et al. | |
| 2004/0019911 A1 | 1/2004 | Gates et al. | |
| 2004/0039834 A1 | 2/2004 | Saunders et al. | |
| 2005/0004997 A1 | 1/2005 | Balcisoy et al. | |
| 2005/0256941 A1 | 11/2005 | Armstrong et al. | |
| 2007/0016611 A1* | 1/2007 | Wang | 707/104.1 |
| 2007/0186005 A1* | 8/2007 | Setlur et al. | 709/231 |
| 2007/0239820 A1* | 10/2007 | Zhong et al. | 709/201 |
| 2008/0137756 A1* | 6/2008 | Scherlis et al. | 375/240.28 |

FOREIGN PATENT DOCUMENTS

| | | |
|---|---|---|
| TW | 448631 | 8/2001 |
| TW | 548974 | 8/2003 |
| TW | 1220480 | 8/2004 |
| TW | 200506663 | 2/2005 |
| WO | 200060500 A1 | 10/2000 |

OTHER PUBLICATIONS

International Preliminary Report on Patentability mailed Jan. 19, 2009.

3GPP, "Universal Mobile Telecommunications System (UMTS); Dynamic and Interactive Multimedia Scenes (DIMS) (3GPP TS 26.142 version 7.1.0 Release 7)," ETSI TS 126 142 v7.1.0, Technical Specification, Oct. 2007, pp. 1-40.

Taiwanese Office Action mailed on Jul. 25, 2011 in related TW Application No. 097102392 (with partial English translation of Search Report).

Mexican Office Action mailed on Jul. 28, 2011 in related application No. MX/a/2009/006990.

Partial Translation of Taiwanese Office Action issued on Feb. 16, 2012 in related TW Application No. 097102392 (note the references cited in the Office Action were already made of record in a previously filed Information Disclosure Statement).

* cited by examiner

SEEKING AND SYNCHRONIZATION USING GLOBAL SCENE TIME

RELATED APPLICATIONS

This application claims priority and benefit from International Application No. PCT/SE2007/001176, filed Dec. 28, 2007, which claims priority to U.S. Patent Application Ser. No. 60/905,627, filed Mar. 8, 2007, the entire teachings of which are incorporated herein by reference.

TECHNICAL FIELD

The present invention relates generally to a method and arrangement for enabling seeking in the global timeline stream of a rich media stream, and for enabling synchronization based on the transport level timestamps in a rich media stream.

BACKGROUND

Scalable Vector Graphics (SVG) is an XML-based language for representation of static and dynamic vector graphics. SVG is vector based which means that content is not made for certain screen resolutions but can easily be scaled. SVG is standardized by the World Wide Web Consortium (W3C). The mobile profile of SVG Version 1.1 was adopted by 3GPP Release 5 and is today supported by roughly 100 million mobile handsets.

SVG Tiny 1.2 is a more powerful version of SVG that is specifically designed for mobile devices, which is more thoroughly described in "Scalable Vector Graphics (SVG) Tiny 1.2 Specification"—W3C Candidate Recommendation, 10 Aug. 2006". This specification is currently a W3C candidate recommendation which has been adopted by 3GPP Release 6. Support for a variety of new multimedia features, comprising full control of audio and video, is included along with micro DOM (uDOM) and scripting <uDOM>.

In addition to being a media type for vector graphics, SVG can also be used as a scene description language, where a scene can be composed temporarily, as well as spatially. In fact, SVG Tiny 1.2 is the base scene description format for the 3GPP work item in Dynamic and Interactive Multimedia Scenes (DIMS), as well as for the OMA work item on Rich-Media Environment (RME). More information on the present standardizations of DIMS can be found in "3GPP TS 26.142 V7.1.0 (2007-09): "3.sup.rd Generation Partnership Project; Technical Specification Group Services and System Aspects; Dynamic and Interactive Multimedia Scenes".

Figure 1A:
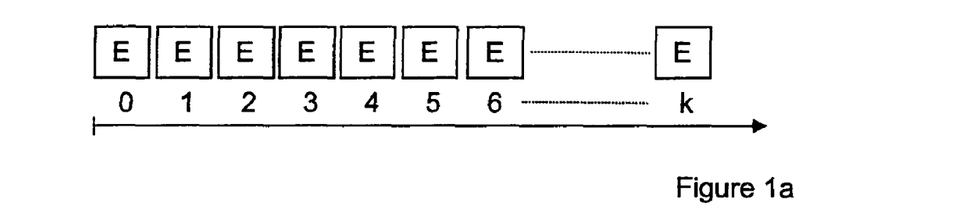
FIG. 1a is a basic overview of a plain SVG stream, according to the prior art.

FIG. 1a refers to a plane SVG, defined as a large document, carrying an SVG scene, here represented by a number of (0-k) SVG elements, E, according to the prior art. The whole scene typically has to be completely downloaded before rendering. In plain SVG there is, thus, only one single timeline, starting at 0, making global and local seeking identical.

DIMS (RME) content, as opposed to plane SVG content, can be split into base scenes and updates of these scenes. The format of these updates is LASeR commands.

Figure 1B:
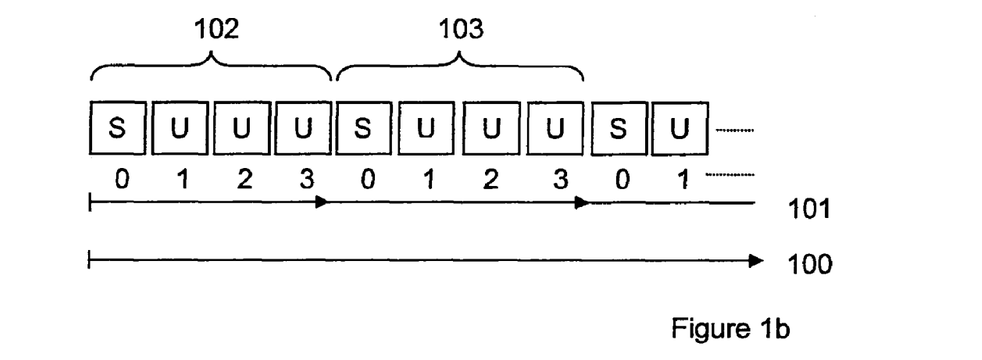
FIG. 1b is a basic overview of a DIMS stream, according to the prior art.

An example of DIMS content according to the prior art is illustrated with FIG. 1b. A sequence of base scenes and updates can be streamed, using the Real-time Transport Protocol (RTP), or stored in a track of a 3GP file. A rendered SVG document consists of a number of units, starting with a base scene S, which will typically be updated with smaller scene updates, U.

Each unit in a DIMS Stream has a media time. The media time is often calculated using an offset from the first unit, using transport level timestamps. This is also referred to as global time 100 in this document, as it is continuous for the entire DIMS stream. SVG also has an internal document time, 101. The internal document, time is reset to zero for each new SVG document, 102,103 in the stream, and is therefore also referred to as as a local time in the respective document. The global timeline will most probably not have the same rate as the local timelines, which typically may have a rate of 1 Hz.

Redundant scenes are redundant random access points (RAP's) that are handled-differently compared to non-redundant scenes as they are used to replace a scene and a number of updates when tuning in. The document time shall start at the same value as for the other users whom haven't tuned in on the redundant scene. It is therefore necessary to move the scene time forward, from the initial time of 0, to the tune-in time.

Currently, it has not been defined when to move the scene time forward in DIMS. The LASeR proposal moves the scene time forward after the scene has completely loaded. The MORE proposal is unspecific in this area, but the alternative, proposed under the MORE flag, moves the scene time forward on initial loading of the document.

Prior art solutions do not enable seeking in the global time of a DIMS stream from the markup, i.e. it is not possible to create "seek" buttons or seek instructions as was possible with plain SVG, having only one single timeline.

One problem raised when using the setCurrentTime method, defined in the SVG uDOM, for adjusting the time of an SVG document is that the SVG document time is changed, while the media time, or global time level remains unchanged, creating a mismatch between this new document time and the media time. Resynchronization in this case is performed in the same way as for any other synchronization, e.g. from disruption in the media transport. It is not defined whether one shall pause one of the elements, or seek forward in the other. Resynchronization can therefore result in the scene time simply being returned to its value before the seek, regaining synchronization but undoing the time change.

Another problem with prior art solutions is that there is no way of seeking over document borders. A DIMS stream may, and probably will, contain a number of non redundant scenes, i.e. SVG documents. Each such document has a separate timeline which begins with time instance zero.

Yet another problem with known technique is that it is not possible to choose the global time as synchronization base for synchronization, i.e. to force other timelines to synchronize to the global time. This can also be referred to as defining the Global Time as being the SyncMaster. This makes it impossible to create a stream which is defined to have its playback based entirely on transport level timestamps.

SUMMARY

It is an object of the present invention to address at least the problems outlined above. More specifically, it is an object of the present invention to provide a mechanism which enables a seeking in a rich media stream to be executed on the basis of a global timeline. It is also an object of the present invention to provide a mechanism which enables synchronization in a rich media stream on the basis of a global timeline.

According to one aspect, the invention refers to a method for executing a seeking in a rich media stream provided from a multimedia server to at least one multimedia client, wherein the seeking is executed in an encoder of a multimedia server. A seeking instruction is inserted into the media stream at time instance X, wherein the seeking instruction comprises an offset time instance Y, wherein X and Y are arbitrary time values measured at a global timeline rate. The media stream is then encoded and transmitted to one or more multimedia clients.

According to one embodiment the seeking instruction may be a server initiated instruction, which may be inserted directly into the media stream by the multimedia server.

According to another embodiment the seeking instruction may instead be a user initiated instruction, which is inserted into a scene of the media stream. A user initiated instruction may be inserted through a secondary stream, which can be linked to an event.

According to another aspect, a method of enabling seeking in a rich media stream to be executed at a decoder of a multimedia client is described. According to this aspect, a seeking instruction is received at time instance X, wherein the seeking instruction comprises an offset time instance Y. A seeking according to the received seeking instruction is then performed at the decoder.

The seeking step may comprise seeking on the entire media stream in the global timeline of the media stream, wherein the seeking is achieved by adding offset Y to the current time instance X, moving the global timeline and one or more internal document timelines towards time instance X+Y in a synchronized manner.

The seeking step may further comprise the step of locating the last Random Access Point (RAP) of said media stream to appear before the desired seek time instance, X+Y, and the step of decoding the RAP and creating a scene with a document time. Subsequent to these steps, the media stream may be decoded from the RAP moving the document time towards the desired seek time instance.

Time instances X and Y may be calculated from transport level timestamps of the rich media stream.

The translation from an internal document timeline to the global timeline may be performed by normalizing the transport level timestamps to the rate of the global timeline.

The rate of the global timeline may be independent of the transport chosen for the media stream. Alternatively, the rate of the global timeline may be predefined.

In addition, the rate of the global timeline may be explicitly sent to the multimedia client.

The rich media stream may contain two or more documents, and in such a case, the suggested seeking step will enable seeking over the different document borders.

The rich media stream may be any of a DIMS/RME stream or a LASeR stream.

The seek instruction may be any of a command, a DOM method or an attribute.

According to another aspect, a method of an encoder for enabling synchronization in a rich media stream is described, wherein a syncMasterGlobal attribute is set in case a continuous global timeline is to be used as synchronization master, while a syncMaster attribute is set in case one or more document timelines are to be used as synchronization Master. The attribute which has been set is then transmitted to one or more receiving entities.

The attribute may be transmitted to the one or more receiving entities, inserted into an SVG element of the rich media stream. Alternatively it may instead be provided to one or more receiving entities via signalling that is external to the rich media stream.

According to yet another aspect, a decoder for executing synchronization in a rich media stream is described, wherein an attribute, having the purpose of signalling a present synchronization master, is receive at the decoder.

The attribute is then used for synchronizing in the rich media stream using a global timeline as a synchronization master in case the received attribute is a syncMasterGlobal attribute and in case the syncMasterGlobal attribute is set, while one or more document timelines are used as a synchronization master in case the received attribute is a syncMaster attribute and in case the syncMaster attribute is set or in case the received attribute is not set.

The global timeline may be based upon transport level timestamps.

According to one embodiment, the syncMasterGlobal attribute may have priority over the syncMaster attribute, in case both attributes are set.

The claimed invention also refers to a multimedia client and a multimedia server adapted to execute the methods described above.

BRIEF DESCRIPTION OF THE DRAWINGS

The present invention will now be described in more detail by means of exemplary embodiments and with reference to the accompanying drawings, in which.

DETAILED DESCRIPTION

Briefly described, the present invention enables seeking in the global timeline of a rich media stream, such as e.g. a DIMS stream, especially when the stream contains both a global timeline and local timelines. The invention enables seeking over document borders in rich media streams, containing multiple documents, each having separate timelines.

According to one embodiment, seeking is performed in the global timeline, or the transport timeline, of a rich media stream, i.e. in a timeline spanning over all document timelines, enabling seeking both over and inside document borders. This also enables seeking in both the document, and transport timelines simultaneously, removing the need to rely on a synchronization module, which may not be well defined, to move the other timeline.

According to the proposed embodiment, the command/seek instruction takes an offset and seeks that amount in the rich media stream, and not just in an individual document inside the stream, from the point of activation. This seek in the rich media stream, or seek in the global time of the rich media, may result in a different rich media document.

Furthermore, the present invention enables synchronization using the global timeline as a synchronization base, enabling a content creator to choose between synchronization based on the internal document timeline or the global timeline. This may be done by introducing a new attribute on the rich media document, referred to as syncMasterGlobal.

By setting the syncMaster attribute, e.g. on an SVG element, the content creator can choose to synchronize on the basis of the internal document time, while synchronization can be based on the global time by instead setting the sync-MasterGlobal attribute.

Figure 2:
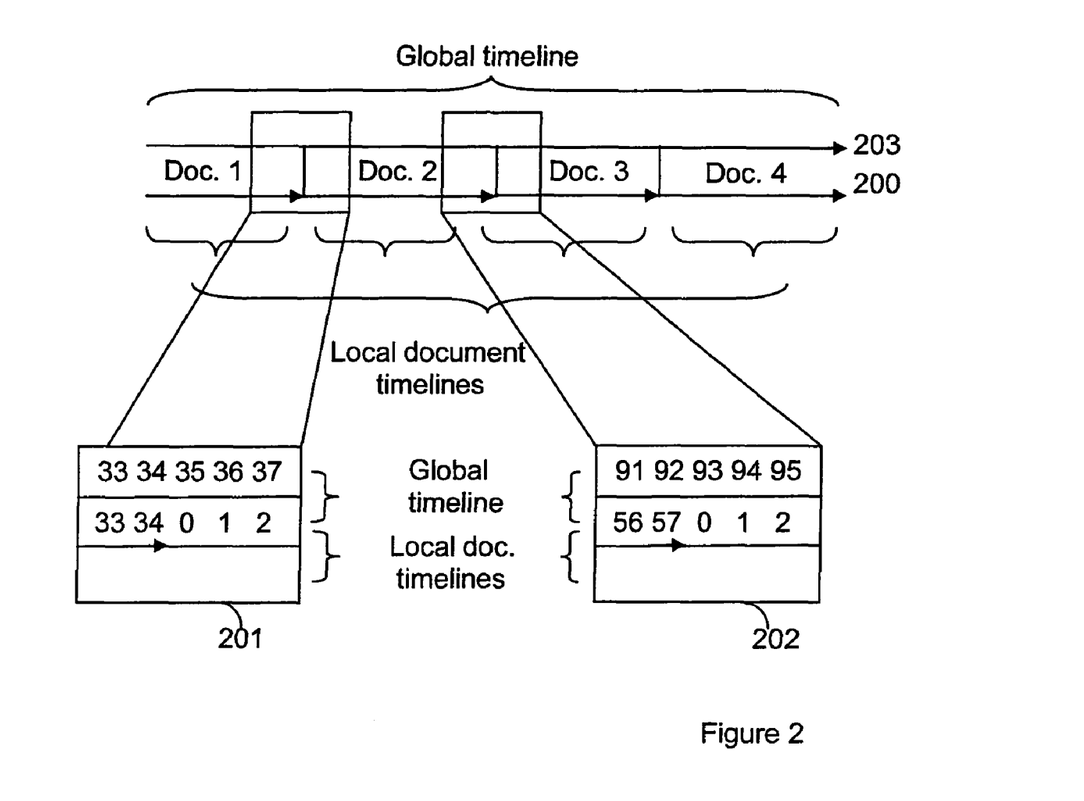
FIG. 2 is a basic overview, illustrating the timing of a global timeline relative to local document timelines.

FIG. 2 generally illustrates the concept of a local timeline and global timelines. As mentioned above, it is presently not possible to use a document timeline 200 to seek in a stream, as the same document time may re-appear a number of times in the stream. This can be seen in the zoomed areas 201 and 202, where e.g. document time 0 appears in both document 2 (Doc.2) and document 3 (Doc.3). As a matter of fact, all documents begin with document time 0 in DIMS/RME and LASeR. In FIG. 2, document time 2 in Doc.3 is represented as global time 95 on the global timeline 203.

According to one embodiment, a command is defined which seeks in the global time of a rich media stream, such as, e.g., a DIMS stream. The seeking is performed on the entire stream, instead of just on the document timelines of the current document. Such a seek will result in a synchronized seek of both the media timeline, i.e. the global timeline, and the internal document timelines in the rich media stream. According to the described embodiment, the command takes an offset and seeks that amount in the rich media stream, rather than just in an individual document inside a stream from a point of activation and may result in a different rich media document.

The global timeline in DIMS/RME or LASeR is calculated from transport level timestamps, e.g. timestamps from a 3GPP file, (Simple Aggregation Format) SAF or RTP timestamps, or LASeR ticks. The global timeline has a rate which is independent of the transport chosen. Typically, the rate for the global timeline is set to 1 Hz, but any predefined rate could be used.

A translation from media timeline to global timeline is performed simply by normalizing the transport level timestamps to the global timeline rate. Just as for RTP timestamps, the global timeline does not have to start at 0, as it is the relative timing which is of importance.

The command "GlobalSeek" to be used when a seek in a rich media session is required may have the following syntax:

<GlobalSeek seekOffset="seekOffset"> where "seekOffset" is a arbitrary, signed time value, measured in the global timeline rate.

Globalseek results in a seek, by the amount "seekOffset", in the global timeline. The seeked global time is obtained by adding "seekOffset" to the current global time. As a rich media stream may contain multiple documents, this seeking can result in a change of rich media document. The document shall also be seeked to the local time corresponding to the seeked global time.

Seeking can be conceptually seen as a function where the global timeline and document timelines are moving forward in a synchronized manner just as in normal playback, but more quickly, and without rendering the media stream. Consequently, a seek backwards in time, i.e. a negative seekOffset, could be executed in a similar way, but by starting again from zero and moving forward.

Seeking in the global timeline shall result in a synchronized seeking in the document timeline of the relevant document. The actual result of the global seeking is however dependent on the underlying documents seeking semantics. SVG, for example, appears to have a relaxed definition of seek, where certain events does not have to be fired during the seek interval.

Figure 3:
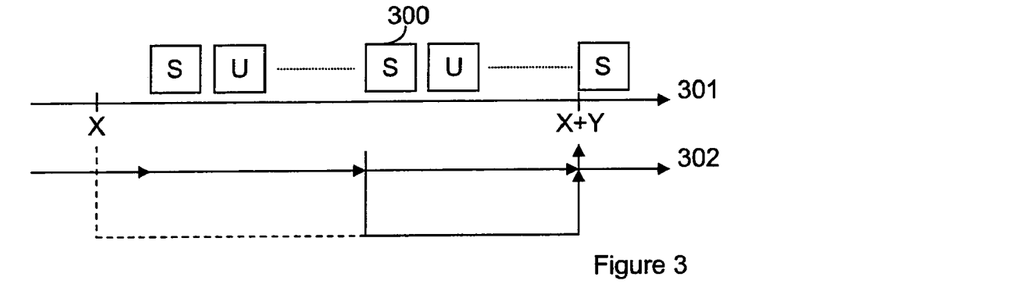
FIG. 3 illustrates a global seek executed at a decoder, according to one embodiment.

An exemplified implementation of global seeking at a decoder, according to one embodiment, will now be described with reference to FIG. 3. In FIG. 3, a decoder, e.g. a DIMS decoder, receives a command in a rich media stream, e.g. a DIMS-stream contained in a 3GP file, at time instance X, where seekOffset may be set to time instance Y as:

<GlobalSeek seekOffset="Y">

Where X and Y are arbitrary time values. The decoder finds the closest random access point (RAP), i.e. the closest, or latest, base scene element 300, before time, instance X+Y. The random access point is decoded and a scene is created with a document time. The rich media stream is then decoded, i.e. media stream units are decoded as the document time is moved forward as quickly as possible to time instance X+Y. At the same time scripts are run as needed. As mentioned above, the synchronized seeking seeks in the global timeline 301, and the document timeline 302 at the same time. The scene can then be displayed and decoding can continue as normal.

Considering the suggested global seek method instead from an encoders point of view, when wishing to seek in a rich media stream, such as a DIMS stream, one simply can insert a GlobalSeek command/instruction, which can be either server initiated, or user initiated. In case of a server initiated command, the command may be inserted directly into the media stream, while a user initiated command may instead be inserted into the relevant scene, e.g. through a secondary stream, linked to an event.

Instead of being predefined, the rate of the global timeline may be sent explicitly to the client. Alternatively, the global seek could use an absolute time, which could be sent to the client.

As an alternative to defining the global seek in XML, global seek may be defined as in LASeR binary or any other textual or non textual representation of a rich media scene, update or command. In addition, instead of being a command, the seeking may be defined e.g. as a DOM method. Another alternative solution to implementing the seeking as a command could be to implement it as an attribute. The seeking would then have an implicit execution time, indicating e.g. the beginning or the end of a document.

The claimed invention also enables synchronization, using the global timeline as synchronization base, or synchMaster.

Figure 4A:
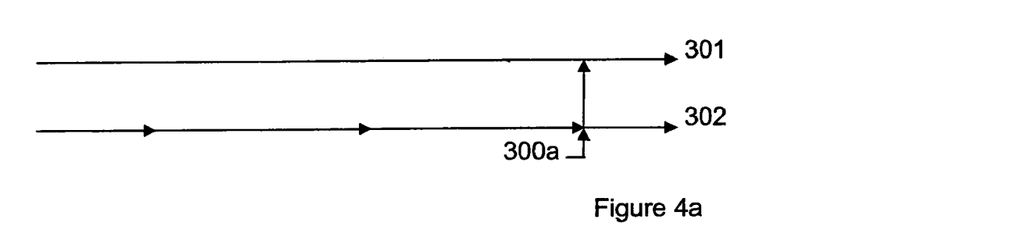
FIG. 4a illustrates how the internal document timelines can be synchronized to the global timeline, according to one embodiment.
Figure 4B:
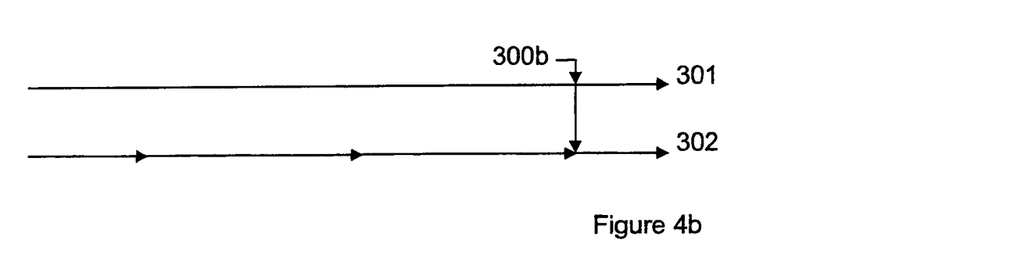
FIG. 4b illustrates how the global timeline may instead synchronized to the internal document timelines.

As illustrated in FIG. 4a, the underlying internal document timeline 302 shall synchronize to the global timeline 301 by setting the global timeline as synchronization master, 300a, as an alternative to using the internal document timeline 302 as a synchronization master, 300b, i.e. by setting the sync-Master attribute, as indicated in FIG. 4b.

These alternative synchronization options may be achieved by introducing a new attribute on the rich media document, referred to e.g. as syncMasterGlobal. The introduction of such a variable enables a content creator to choose between synchronization based on the internal document time, by setting the syncMaster attribute on an element of a stream, typically an SVG element, or based on the global timeline, or transport timeline, by setting the new syncMasterGlobal attribute on a media stream element.

The syncMasterGlobal attribute may be implemented e.g. in DIMS/RME or LASeR. This new variable typically is a Boolean attribute which is added to a media stream, e.g. an SVG element, having the default value "false". When "true", the global timeline, i.e. the transport level timestamps of the stream, shall be used as a synchronization master, i.e. other elements in the time container, in this case the internal document timeline, will be forced to synchronize to the global timeline. The syncMasterGlobal attribute typically has priority over the syncMaster attribute if both are set to "true". Otherwise the same rules should apply to syncMasterGlobal as to syncMaster.

Alternatively, an attribute may be specified which signals which of the two respective global or local timelines that is to be considered as synchMaster. In such a way, some source, external to the DIMS stream, may be used to signal the stream to be syncMaster.

A multimedia server adapted to enabling seeking in a rich media stream, according to one embodiment, will now be described with reference to FIG. 5.

Figure 5:
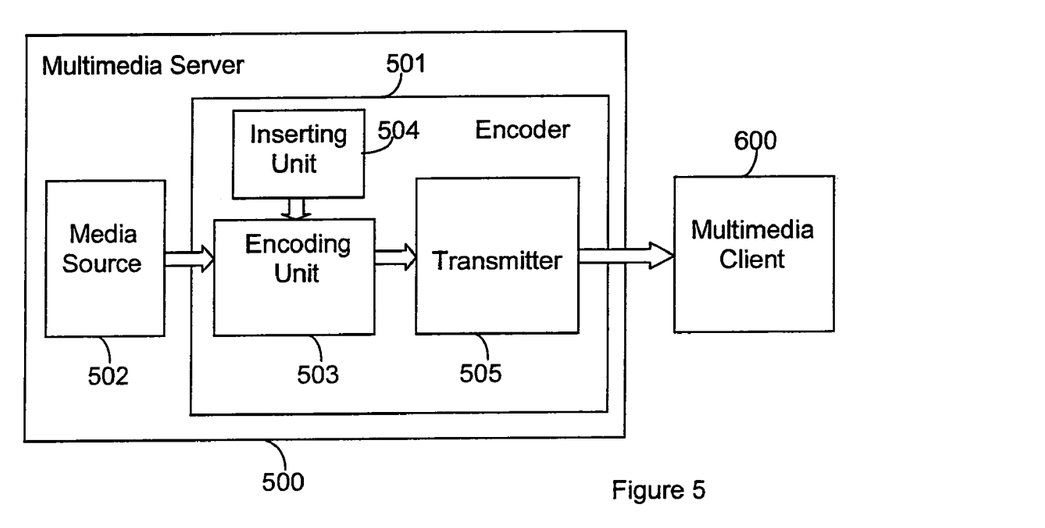
FIG. 5 illustrates an exemplified multimedia server, according to one embodiment.

FIG. 5 shows a multimedia server 500, comprising an encoder 501, which is adapted to provide a media stream to one or more clients, typically multimedia clients. The encoder receiving the media stream from a media source 502, comprises an encoding unit 503 for encoding the media stream after an inserting unit 504 has inserted a seeking instruction into the media stream. The seeking instruction, inserted at a time instance X, comprises an offset time instance Y, as described above. The encoder also comprises a transmitter 505 for transmitting the media stream to one or more terminating multimedia clients 600.

According to an alternative embodiment, an encoder is adapted to enable synchronization in a rich media stream based on the global timeline, as an alternative to synchronization based on the one or more document timelines. Such an encoder may be provided if the inserting unit 504 of FIG. 5 is adapted to introduce a new attribute, syncMasterGlobal, as described earlier in this document. By adapting the inserting unit 504 to set either the syncMasterGlobal or syncMaster, either the global timeline or the one or more document timelines of the rich media stream can be chosen to be syncMaster.

Figure 6:
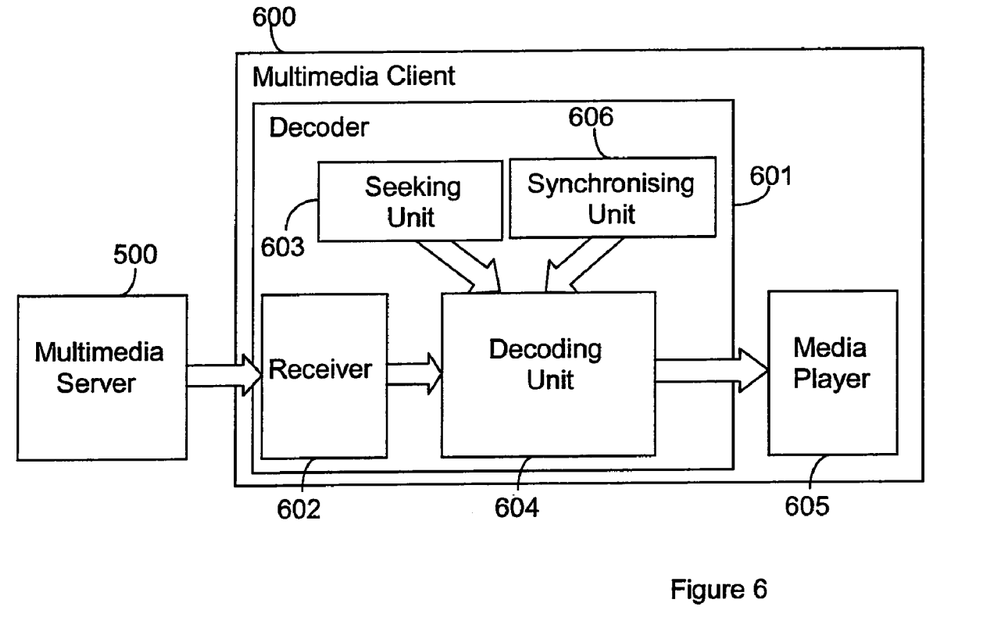
FIG. 6 illustrates an exemplified multimedia client, according to one embodiment.

A multimedia client adapted to enable seeking in a rich media stream, according to one embodiment is described in FIG. 6, where a multimedia server 500 provides a media stream to the multimedia client 600. The multimedia client 600 comprises a decoder 601 which receives a media stream, comprising a seeking instruction, at a receiver 602. The seeking instruction, received at time instance X, comprises an offset time instance Y, as described previously. A seeking unit 603 is adapted to perform a seeking at a decoding unit 604 of the decoder 601, according to the seeking instruction. Once the seeking has been executed, the rich media stream is decoded and provided to a media player 605 of the multimedia client 600.

According to an alternative embodiment, the decoder may comprise a synchronization unit 606, which may be adapted to synchronize in a rich media stream, received via receiver 602. The synchronization unit 606 is adapted to recognize if a syncMasterGlobal attribute is set, thereby indicating that the global timeline is to be used as a synchronization master, or if the syncMaster is set, i.e. if the one or more document timelines are to be used as synchronization master.

According to yet another alternative embodiment, a seek command may be combined with synchronization. With the global timeline set to syncMasterGlobal, everything else will synchronize to it. By setting the global timeline to syncMaster, it will be possible to seek in the global timeline only, letting the synchronization module fix the rest. The synchronization module would simply notice that the local timeline is out of synchronization and move it to the right position.

Figure 7:
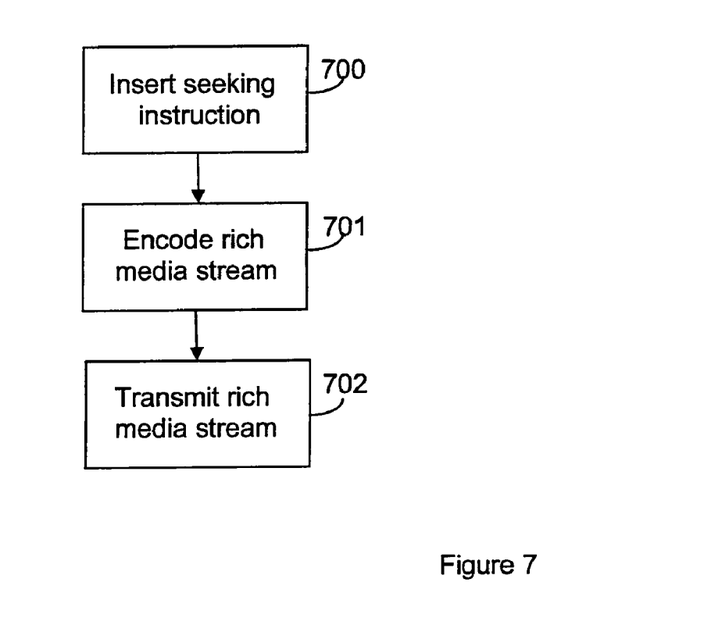
FIG. 7 is a, block diagram illustrating a method of seeking in a rich media stream executed at an encoder.

A method of seeking in a rich media stream to be executed in an encoder according to the embodiment described above may be described according to the block diagram of FIG. 7.

In a first step 700, a seeking instruction is inserted into a rich media stream. The rich media stream, comprising the instruction, is encoded in a next step 701, and in a final step 702, the rich media stream is transmitted to one or more media clients.

A method of seeking in a rich media stream, wherein the method is instead executed in a decoder, according to the embodiment described above, may be described with reference to the block diagram of FIG. 8.

Figure 8:
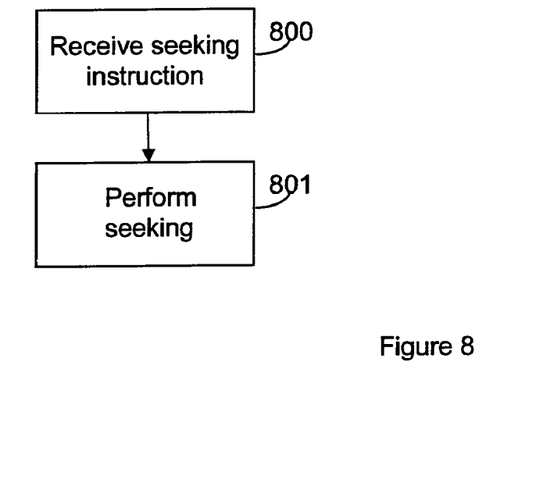
FIG. 8 is a block diagram illustrating a method of seeking in a rich media stream executed at a decoder.

In a first step 800 of FIG. 8, a seeking instruction is received by the decoder, and the seeking is being performed according to the received seeking instruction in a final step 801.

Figure 9:
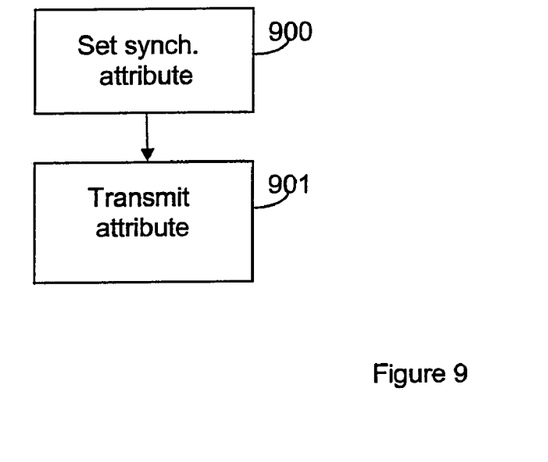
FIG. 9 is a block diagram illustrating a method of an encoder for enabling synchronization in a rich media stream.

A method of an encoder for enabling synchronization in a rich media stream, using any of the attributes as described above is illustrated with the block diagram of FIG. 9.

In a first step 900 of FIG. 9, it is determined which timeline to use as synchronization master by setting a synchronization attribute, i.e. syncMasterGlobal or syncMaster. In a next step 901 the synchronization attribute is transmitted to one or more receiving entities.

Figure 10:
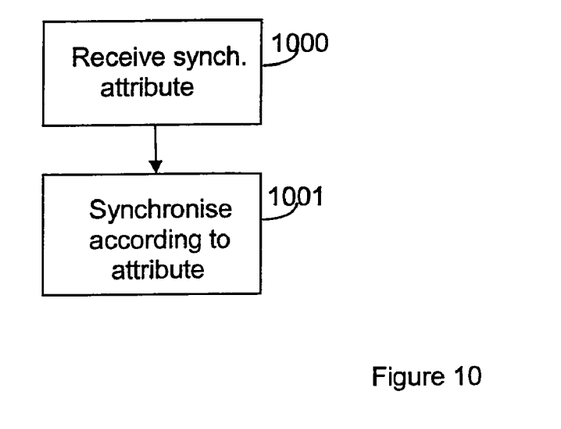
FIG. 10 is a block diagram illustrating a method of a decoder for executing synchronization in a rich media stream.

A method of a decoder for executing synchronization in a rich media stream as described above is illustrated with block diagram 10, wherein a synchronization attribute is received in a first step 1000, and wherein a synchronization according to the received attribute is executed in the rich media stream in a final step 1001.

To sum up, the suggested use of seeking in the global, transport level timeline enables seeking directly from the content of a rich media stream. Seeking will be possible both over and inside document borders. In addition, the proposed seeking mechanism enables seeking in both the document and transport timelines simultaneously, removing the need to rely on a synchronization module, which may not be well defined, to move the other timeline.

While the invention has been described with reference to specific exemplary embodiments, the description is generally only intended to illustrate the inventive concept and should not be taken as limiting the scope of the invention. Although concepts, such as SVG, DIMS, RME, SAF, LASeR, uDOM and MORE have been used when describing the above embodiments, any other similar suitable standards, protocols and network elements may basically be used as described herein. The present invention is generally defined by the following independent claims.

The invention claimed is:

1. A method of enabling seeking in a rich media stream provided from a multimedia server to at least one multimedia client, wherein said multimedia server comprises an encoder, said method comprising the following steps, executed at said encoder:

inserting a seeking instruction into said rich media stream containing a global timeline and at least two documents, each having a separate local timeline, said seeking instruction being an instruction to seek in the global timeline at an offset time instance Y added to a current time instance X, wherein X and Y are arbitrary time values, encoding said rich media stream, and transmitting the rich media stream to said at least one multimedia client, enabling seeking both within and over document borders at said at least one multimedia client.

2. A method according to claim 1, wherein said seeking instruction is a user initiated instruction, inserted into a scene of said rich media stream.

3. A method according to claim 2, wherein said seeking instruction is inserted through a secondary rich media stream, said secondary rich media stream being linked to an event.

4. A method according to claim 1, wherein said seeking instruction is a server initiated instruction, inserted directly into the rich media stream by said multimedia server.

5. A method according to claim 1, wherein time instance X and Y are calculated from transport level timestamps of said rich media stream.

6. A method according to claim 1, wherein a translation from a local timeline to said global timeline is performed by normalizing transport level timestamps to a rate of the global timeline.

7. A method according to claim 1, wherein a rate of the global timeline is independent of a transport chosen for the rich media stream.

8. A method according to claim 1, wherein a rate of the global timeline is a predefined rate.

9. A method according to claim 1, wherein a rate of said global timeline is explicitly sent to said multimedia client.

10. A method according to claim 1, wherein said rich media stream is any of a DIMS/RME stream or a LASeR stream.

11. A method according to claim 1, wherein said seek instruction is any of: a command, a DOM method or an attribute.

12. A method of enabling seeking in a rich media stream provided from a multimedia server to a multimedia client, wherein said multimedia client comprises a decoder, said method comprising the following steps, executed at said decoder:

receiving a seeking instruction in said rich media stream containing a global timeline and at least two documents, each having a separate local timeline, said seeking instruction instructing the decoder to seek in the global timeline at an offset time instance Y added to a current time instance X, wherein X and Y are arbitrary time values, and performing a seeking according to said received seeking instruction, enabling seeking both within and over document borders.

13. A method according to claim 12, wherein said seeking step comprises seeking on the entire rich media stream in said global timeline by adding offset time instance Y to the current time instance X, moving the global timeline and one or more local timelines towards time instance X+Y, thereby enabling synchronization of the global timeline to the one or more local timelines.

14. A method according to claim 12, wherein said seeking step further comprises the following steps:

locating a last Random Access Point (RAP) of said rich media stream to appear before the desired seek time instance X+Y, decoding said RAP and creating a scene with a document time, and decoding the rich media stream from said RAP moving the document time towards said seeked time.

15. A method of an encoder for enabling synchronization in a rich media stream, said method comprising the following steps:

setting a first synchronization master attribute on an element of said rich media stream in case a continuous global timeline is to be used as synchronization master, or setting a second synchronization master attribute on an element of said rich media stream in case one or more document timelines are to be used as synchronization master, and, transmitting said attribute to at least one receiving entity, enabling the receiving entity to synchronize using the received attribute as a synchronization base for said rich media stream.

16. A method according to claim 15, wherein said element is an SVG element of said rich media stream.

17. A method according to claim 15, wherein said attribute is provided to said at least one receiving entity via signalling that is external to said rich media stream.

18. A method according to claim 15, wherein the global timeline is based upon transport level timestamps.

19. A method according to claim 15, wherein if both attributes are set, the second synchronization master attribute has priority over the first synchronization master attribute.

20. A method of a decoder for executing synchronization in a rich media stream, said method comprising the following steps:

receiving a synchronization master attribute in an element of said rich media stream, said attribute indicating a present synchronization master for said rich media stream, and synchronizing in said rich media stream using a global timeline as a synchronization master in case said received attribute is a first synchronization master attribute and in case said first synchronization master attribute is set, or using one or more document timelines as a synchronization master in case said received attribute is a second synchronization master attribute and in case said second synchronization master attribute is set or in case the received attribute is not set.

21. A multimedia server, comprising:

an encoder, for enabling seeking in a rich media stream provided to at least one multimedia client, said encoder comprising:

an inserting unit for inserting a seeking instruction into said rich media stream containing a global timeline and at least two documents, each having a separate local timeline, said seeking instruction being an instruction to seek in the global timeline an offset time instance Y added to a current time instance X, wherein X and Y are arbitrary time values, an encoding unit for encoding the rich media stream, and a transmitter for transmitting the rich media stream to said at least one multimedia client, enabling seeking both within and over document borders at said at least one multimedia client.

22. A multimedia client, comprising:

a decoder, for enabling seeking in a rich media stream provided from a multimedia server, said decoder comprising:

a receiver for receiving a seeking instruction in said rich media stream containing a global timeline and at least two documents, each having a separate local timeline, said seeking instruction instructing the decoder to seek in the global timeline at an offset time instance Y added to a current time X, wherein X and Y are arbitrary time values, a seeking unit for performing a seeking according to said received seeking instruction, and a decoding unit for decoding said rich media stream, enabling seeking both within and over document borders.

23. A multimedia server comprising:

an encoder for enabling selection of a synchronization base in a rich media stream, said encoder comprising:

an inserting unit for inserting a first attribute into an element of said rich media stream in case synchronization is to be based on a global timeline, or for inserting a second attribute in an element of said rich media stream in case synchronization is to be based on one or more document timelines, and a transmitter for transmitting said attribute to at least one receiving entity, enabling said at least one receiving entity to choose synchronization base for said rich media stream on the basis of the set attribute.

24. A multimedia client comprising:

a decoder for selecting synchronization base in a rich media stream, said decoder comprising:

a receiver for receiving an attribute in an element of said rich media stream and for providing said rich media stream to a decoding unit, said attribute having the purpose of indicating a present synchronization master for said rich media stream, and a synchronizing unit in said rich media stream, wherein said synchronizing unit is adapted to use a global timeline as synchronization master in case said received attribute is a first attribute and in case said first attribute is set, or to use one or more document timelines as synchronization master in case said attribute is a second attribute and in case said second attribute is set or in case the received attribute is not set.

* * * * *